US007609441B2

(12) United States Patent
Lundgren

(10) Patent No.: US 7,609,441 B2
(45) Date of Patent: Oct. 27, 2009

(54) DISTORTED PUPIL RELAY FOR SPECTRAL FILTERING

(75) Inventor: Mark A. Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 567 days.

(21) Appl. No.: 11/138,782

(22) Filed: May 26, 2005

(65) Prior Publication Data

US 2006/0269215 A1 Nov. 30, 2006

(51) Int. Cl.
*G02B 23/24* (2006.01)
(52) U.S. Cl. ...................... 359/434; 359/708
(58) Field of Classification Search .................. None
See application file for complete search history.

(56) References Cited

U.S. PATENT DOCUMENTS

| 2,131,232 A | * | 9/1938 | Ogle | 351/201 |
| 2002/0191294 A1 | * | 12/2002 | Duggan | 359/578 |
| 2005/0122473 A1 | * | 6/2005 | Curatu | 351/200 |

OTHER PUBLICATIONS

Sofya Poger and Elli Angelopoulou, Multispectral Sensors in Computer Vision, Stevens Institute of Technology, pp. 1-16, Department of Computer Science, Technical Report CS-2001-3, Hoboken, New Jersey.
Dennis W. Morelli, Variable Filters, pp. 1-19, Optical Coating Laboratory, Incorporated, 1998.
Glenn Healey and David Slater, Models and Methods for Automated Material Identification in Hyperspectral Imagery Acquired Under Unknown Illumination and Atmospheric Conditions, pp. 1-12, IEEE Transactions on Geoscience and Remote Sensing, vol. 37, No. 6, Nov. 1999.
K. Kim Luu, Charles L. Matson, Capt. Joshua Snodgrass, S. Maile Giffin, Kris Hamada, John V. Lambert, Object Characterization from Spectral Data, pp. 1-11, Kihei, Hi.
Di-Yuan Tzeng, Roy S. Berns, Spectial-Based Ink Selection for Multiple-Ink Printing I. Colorant Estimation of Original Objects, pp. 106-111, The Sixth Color Imaging Conference: Color Science, Systems and Applications.

* cited by examiner

*Primary Examiner*—Lee Fineman
(74) *Attorney, Agent, or Firm*—Haynes and Boone, LLP.

(57) ABSTRACT

A system and method for spectral filtering of images are provided. The system and method utilize a first biconic lens surface to astigmatize a substantially 2-D system pupil into a substantially 1-D pupil (e.g., slit-shaped), and a second biconic lens surface to restore the astigmatic pupil to good quality. Advantageously, the light stream may be filtered with a variable filter.

19 Claims, 4 Drawing Sheets

DISTORTED PUPIL RELAY FOR SPECTRAL FILTERING

TECHNICAL FIELD

The present invention relates generally to optics and, more particularly, to an optics system and method for spectral filtering of images.

BACKGROUND

Imaging for various applications, including space applications (e.g., satellite servicing) and machine vision applications (e.g., quality control and matching of paint colors), is becoming more important.

Conventional color video cameras use only three colors of light to produce information about the three colors perceived by human vision: red, green, and blue. This is typically done by using three focal planes, which is wasteful, or by filtering only one of the three colors into each pixel of the focal plane, which results in information loss.

However, a computer vision system can use many more "colors", as such a system can use an arbitrarily large number of wavelength-classes. Furthermore, instrument-assisted spectral imaging can extend the range to include not only the visible band but also the ultraviolet and infrared regions of the spectrum invisible to humans. Accordingly, state of the art imaging is beginning to include multi-spectral data. To produce multi-spectral data, state of the art methods generally send an entire 2-D light stream (usually having a circular cross-section) through a color filtering device that typically includes large, delicate, and expensive hardware for providing filters that can filter the entire 2-D light beam.

Modern multi-spectral computer vision systems may use electronically tunable filter (ETF) technology, by which an entire beam of light passing through a camera is filtered into a narrow band of color by an ETF (e.g., accousto-optical, Fabry-Perot, liquid crystal). ETFs can generally fit a large 2-D beam through their clear apertures, but they share the qualities of complexity, expense, fragility, specialized electronic power requirements, and use of materials that may be sensitive to radiation.

Simpler filters, such as variable filters (e.g., linear or circular variable filters), are inexpensive and robust but have not been suited for image filtering as they typically filter a 1-D beam of light having a narrow cross-section (usually produced in scientific instruments that do not create 2-D images). If such variable filters were used to filter an entire 2-D light stream (e.g., having a circular cross-section), up to about 90% of the incoming light would be wasted.

Thus, a robust system and method for spectral filtering of images with improved size, power, and weight characteristics is highly desirable.

SUMMARY

The present invention provides a system and method for spectral filtering of images utilizing a first biconic lens surface to distort a 2-D system pupil into a substantially 1-D pupil (e.g., slit-shaped), and then utilizing a second biconic lens surface to restore a filtered image to good quality. Advantageously, the light stream of the image may be filtered effectively with a variable filter.

In accordance with an embodiment of the present invention, an optical system is provided, the system including a first biconic surface for receiving an image of an object, the first biconic surface distorting a pupil from a circular shape to a slit shape thereby providing a compressed beam of light with a slit-shaped cross-section; a variable filter for filtering the compressed beam of light; and a second biconic surface for correcting aberrations from the filtered beam of light.

In accordance with another embodiment of the present invention, an optical system is provided, the system including a first relay lens for providing an intermediate image of an object through a circular system stop; a first biconic lens group optically coupled to the first relay lens for distorting a pupil from a circular shape to a slit shape thereby providing a compressed beam of light with a slit-shaped cross-section; a second relay lens optically coupled to the first biconic lens group for relaying the compressed beam of light; a variable filter optically coupled to the second relay lens for filtering the compressed beam of light; and a second biconic lens group optically coupled to the variable filter for correcting aberrations from the filtered beam of light to thereby restore the image.

In accordance with yet another embodiment of the present invention, a method of spectral filtering is provided, the method including receiving an image of an object at a first biconic surface; distorting a pupil from a circular shape to a slit shape with the first biconic surface, thereby providing a compressed beam of light with a slit-shaped cross-section; filtering the compressed beam of light; and correcting aberrations from the filtered beam of light with a second biconic surface.

In accordance with yet another embodiment of the present invention, pupil relay system is provided, the system including a first lens group for receiving light from an optical system having an aperture stop, the first lens group including a first biconic surface capable of inducing an astigmatic pupil of the stop; and a second lens group including a second biconic surface for reducing the astigmatism induced by the first biconic surface.

Advantageously, the present invention provides superior color recognition with space, power, and weight improvement. In one example, the present invention may be used with small, low power, and light weight sensors for autonomous space vehicles to assess other objects in space, and with machine vision applications, such as quality control and matching of paint colors. Other areas of application include but are not limited to robotic vision, photography, and interior decorating.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1A:
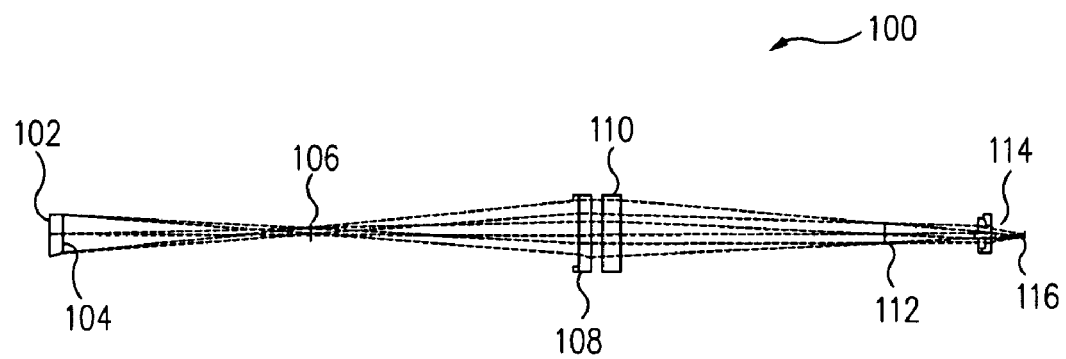
FIG. 1 shows a simplified side view of an optical system for spectral filtering in accordance with an embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

The present invention provides a system and method for spectral filtering of images utilizing a first biconic lens surface to distort a 2-D system pupil into a substantially 1-D pupil (e.g., slit-shaped), filtering the light beam of the image with a variable filter, and then utilizing a second biconic lens surface to restore the filtered image to good quality.

As used herein, a biconic surface is a surface having two differing curvatures along a first and a second axis, and a biconic lens is a lens which includes a biconic surface or which has similar properties (e.g., providing differing focal lengths in different axis).

As used herein, a pupil is an image of an aperture stop (also known as an iris) as seen-from object space (also known as an entrance pupil) and image space (also known as an exit pupil), and will dictate the geometric propagation of the ray bundle. An aperture stop restricts light rays transmitted through an optical system and defines the amount of light flux transmitted by an optical system. Typically, optical system aperture stops have been circular due to the rotational symmetry of most optical systems and their ease of fabrication.

FIG. 1 shows a simplified view of an optical system 100 for spectral filtering in accordance with an embodiment of the present invention. System 100 includes a first relay lens group 102, a system stop 104, an intermediate image at a plane 106, a first biconic lens group 108, a second relay lens group 110, a variable filter 112, and a second biconic lens group 114, thereby providing a filtered image 116 at an image focal plane.

Figure 2B:
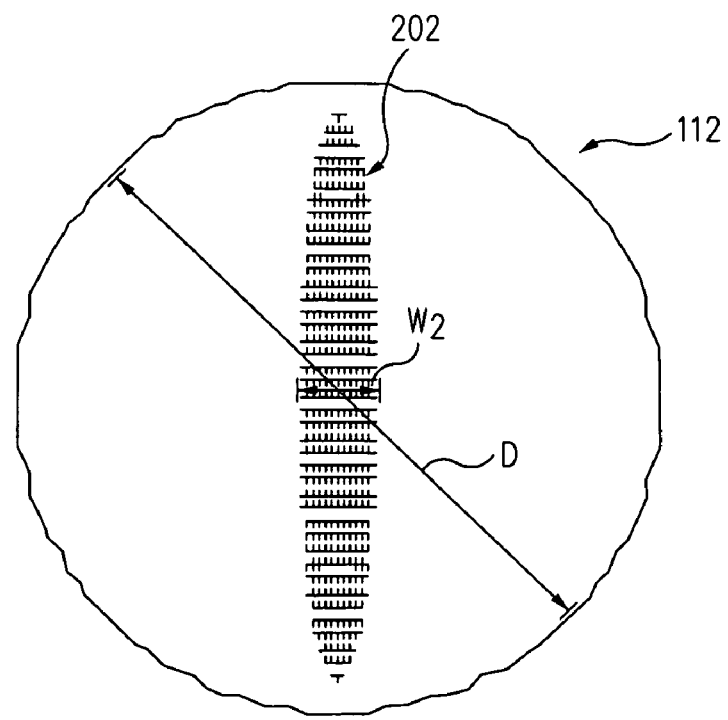
FIG. 2B shows an axial view of a distorted pupil in accordance with an embodiment of the present invention.
Figure 2A:
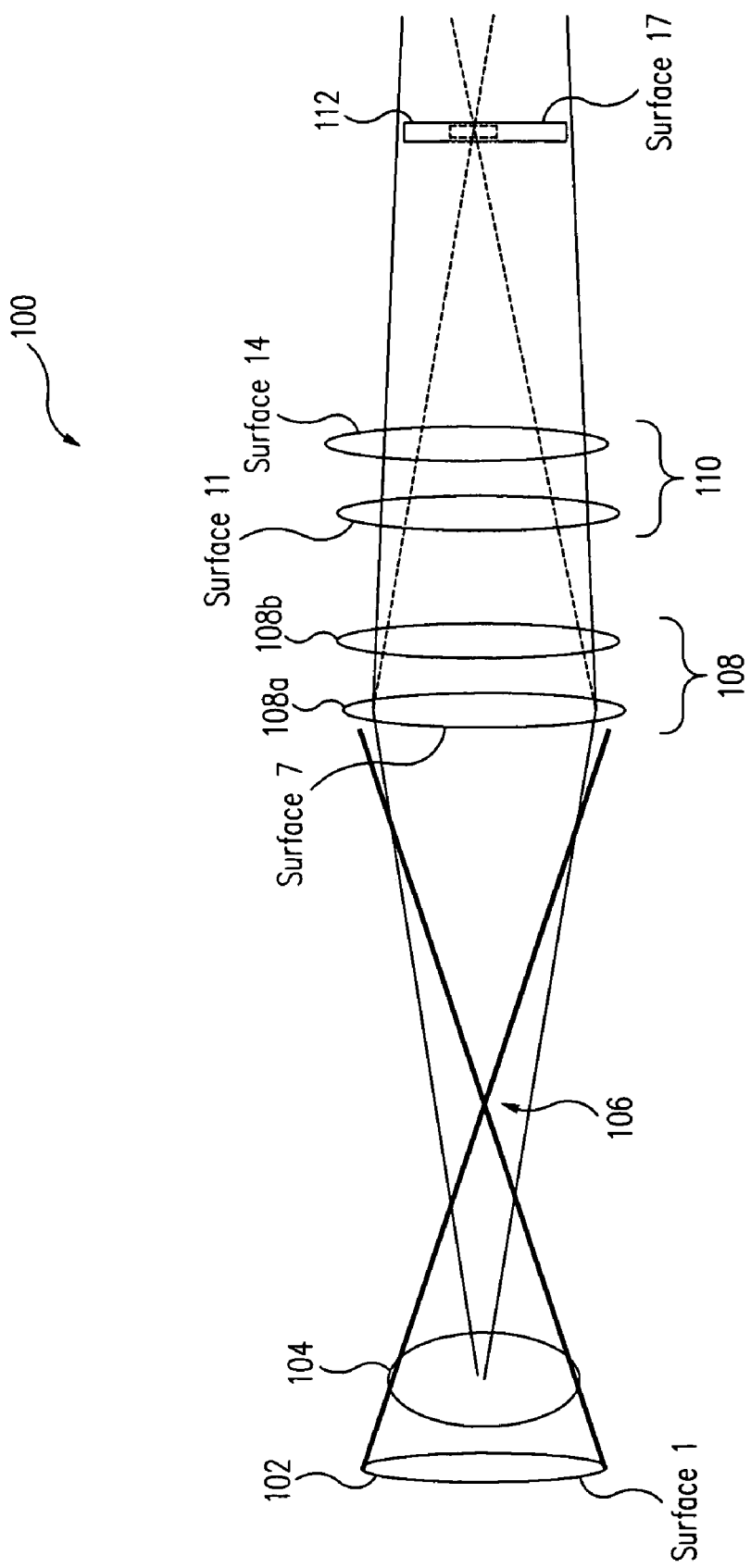
FIG. 2A shows a more detailed illustration of the optical system for spectral filtering of FIG. 1 in accordance with an embodiment of the present invention.
Figure 2A:
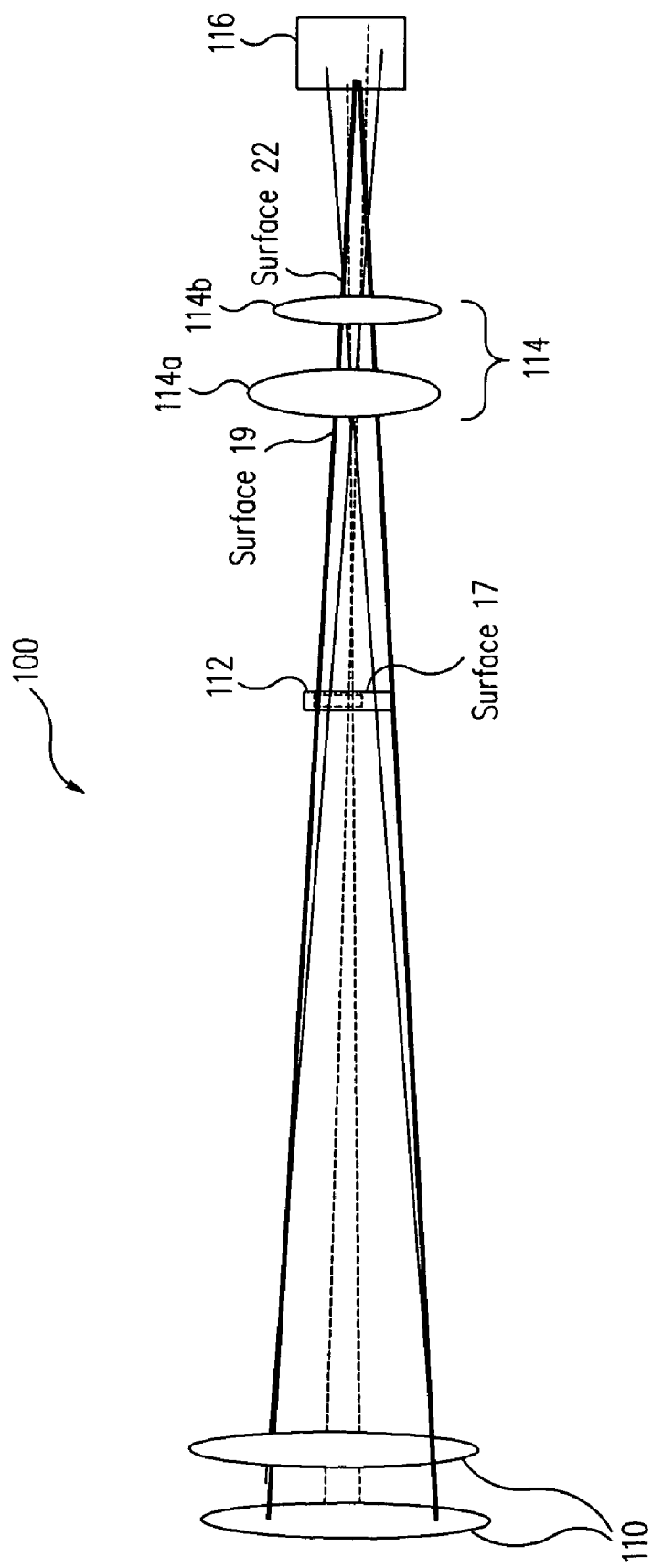

FIGS. 2A and 2B show more detailed illustrations of the optical system 100 of FIG. 1 in accordance with an embodiment of the present invention. Marginal rays shown by thick lines relate to an image of an object (not shown) and chief rays shown by thin lines relate to the pupil. Dashed lines show an example of a top view of the ray bundles and distorted pupil and solid lines show an example of a side view of the ray bundles and distorted pupil.

First relay lens group 102 forms an intermediate image of an object (not shown) from infinity (or from another optical system in front of first relay lens group 102, such as a large telescope) at a plane 106, and relays the image to first biconic lens group 108. Since optical systems must progress through a pupil-image-pupil-image iteration, an intermediate image is formed at plane 106 to allow for generation of another pupil at 112. In one embodiment, the combination of first relay lens group 102 and system stop 104 may simulate the exit pupil of a preceding imaging optical system (e.g., a camera lens, a large telescope). In another embodiment, first relay lens group 102 may be a part of the multi-spectral system for imaging an object with no preceding optics. Thus, first relay lens group 102 may include the system stop and/or a system pupil.

In one example, first relay lens group 102 (and system stop 104) may have a 15 mm diameter circular aperture and provide a field of view of about 0.4 degrees (twice the value of the "maximum field" in Table 1 below). It is noted that the field of view may vary based upon the type of optical system preceding the first relay lens group 102, if any.

First biconic lens group 108 is optically coupled to first relay lens group 102 and includes a biconic surface to distort or compress the system pupil from a circular shape to a non-circular shape, such as a slit shape, thereby providing a compressed beam of light with a non-circular cross-section. First biconic lens group 108 thus distorts the beam of light (or the pupil) into a substantially long narrow (astigmatic) line, which can ultimately be filtered by a variable filter.

Second relay lens group 110 images the system stop at the pupil and relays the intermediate image to variable filter 112, similar to a modern periscope. Variable filter 112 may be selected from the group consisting of a linear variable filter, a circular variable filter, a rotatable prism, and an electronically variable filter. Variable filter 112 should be able to at least split incoming light into light of a continuous band of wavelengths and/or into a plurality of different light portions having different wavelengths. Variable filter 112 may be tuned to different wavelengths by translating the incident beam or the filter in the linearly varying filter direction. Variable filter 112 may also take an input which is polychromatic (a wide wavelength band, for example several 100 nm wide) and output a subset of the input (at a narrower wavelength band, for example between about 10-30 nm wide). It is noted that a variety of variable filters are within the scope of the present invention and are not limited to those mentioned in this document.

Second biconic lens group 114 is optically coupled to variable filter 112 and includes a biconic surface to subtract the aberrations from the image after filtering, thereby providing a restored image 116 which is formed at an image focal plane. The filtered restored image may also be passed to another optical system.

Commonly available optical design software such as, for example, ZEMAX® from ZEMAX Development Corporation of San Diego, Calif., may be used to assist in describing the various characteristics (e.g., radius, thickness, glass type, diameter, and whether the surface is conic) corresponding to each surface region of each individual element/group within optical system 100. In the example configuration shown in FIG. 2A, the ZEMAX software outputs surface data describing these surface characteristics as illustrated in Table 1.

TABLE 1

ZEMAX Software Output Describing Optical System 100

GENERAL LENS DATA:

| | |
|---|---|
| Surfaces | 24 |
| Stop | 2 |
| System Aperture | Float By Stop Size = 12 |
| Glass Catalogs | SCHOTT |
| Ray Aiming | Off |

TABLE 1-continued

ZEMAX Software Output Describing Optical System 100

| | |
|---|---|
| Apodization | Uniform, factor = 0.00000E+000 |
| Effective Focal Length | −86.00004 (in air at system temperature and pressure) |
| Effective Focal Length | −86.00004 (in image space) |
| Back Focal Length | 10.00663 |
| Total Track | 652.9968 |
| Image Space F/# | 3.583335 |
| Paraxial Working F/# | 4.645796 |
| Working F/# | 4.631734 |
| Image Space NA | 0.138196 |
| Object Space NA | 1.2e−009 |
| Stop Radius | 12 |
| Paraxial Image Height | 0.3184082 |
| Paraxial Magnification | 0 |
| Entrance Pupil Diameter | 24 |
| Entrance Pupil Position | 0 |
| Exit Pupil Diameter | 6.627832 |
| Exit Pupil Position | −23.74311 |
| Field Type | Angle in degrees |
| Maximum Field | 0.212132 |
| Primary Wave | 0.55 |
| Lens Units | Millimeters |
| Angular Magnification | −3.621093 |

Fields: 5
Field Type: Angle in degrees

| # | X-Value | Y-Value | Weight |
|---|---|---|---|
| 1 | 0.000000 | 0.000000 | 1.000000 |
| 2 | 0.000000 | 0.150000 | 1.000000 |
| 3 | 0.150000 | 0.150000 | 10.000000 |
| 4 | 0.150000 | 0.000000 | 1.000000 |
| 5 | −0.150000 | −0.150000 | 1.000000 |

Wavelengths: 5
Units: μm

| # | Value | Weight |
|---|---|---|
| 1 | 0.550000 | 1.000000 |
| 2 | 0.650000 | 1.000000 |
| 3 | 0.500000 | 1.000000 |
| 4 | 0.725000 | 1.000000 |
| 5 | 0.425000 | 1.000000 |

SURFACE DATA SUMMARY:

| Surf | Type | Radius | Thickness | Glass | Diameter | Conic |
|---|---|---|---|---|---|---|
| OBJ | STANDARD | Infinity | Infinity | | 0 | 0 |
| 1 | PARAXIAL | — | 0 | | 40 | — |
| STO | STANDARD | Infinity | 10 | | 24 | 0 |
| 3 | STANDARD | Infinity | 0 | | 22.87405 | 0 |
| 4 | STANDARD | Infinity | 190 | | 22.87405 | 0 |
| 5 | STANDARD | Infinity | 190 | | 1.480964 | 0 |
| 6 | STANDARD | Infinity | 0 | | 25.68788 | 0 |
| 7 | BICONICX | −150 | 5 | BK7 | 30 | 2.417964 |
| 8 | STANDARD | −149.5501 | 1 | | 30 | 0 |
| 9 | STANDARD | −82.89426 | 5 | F2 | 30 | 0 |
| 10 | STANDARD | −129.0374 | 0 | | 30 | 0 |
| 11 | PARAXIAL | — | 0 | | 27.32112 | — |
| 12 | STANDARD | Infinity | 10 | | 27.32112 | 0 |
| 13 | STANDARD | Infinity | 10 | | 27.66993 | 0 |
| 14 | PARAXIAL | — | 0 | | 40 | — |
| 15 | STANDARD | Infinity | 193.2154 | | 28.10252 | 0 |
| 16 | STANDARD | Infinity | −23 | | 11.8855 | 0 |
| 17 | STANDARD | Infinity | −6.433119 | | 13.78555 | 0 |
| 18 | STANDARD | Infinity | 23 | | 14.317 | 0 |
| 19 | BICONICX | 38.60614 | 5 | BK7 | 16 | −0.5367116 |
| 20 | STANDARD | −191.3447 | 25.21447 | | 16 | 0 |
| 21 | STANDARD | 10.28114 | 5 | F2 | 10 | 0 |
| 22 | BICONICX | 6.924963 | 0 | | 8 | 0 |
| 23 | STANDARD | Infinity | 10 | | 3.203235 | 0 |
| IMA | STANDARD | Infinity | | | 1.137959 | 0 |

TABLE 1-continued

ZEMAX Software Output Describing Optical System 100

SURFACE DATA DETAIL:

| | |
|---|---|
| Surface OBJ | STANDARD |
| Surface 1 | PARAXIAL |
| Focal length | 200 |
| OPD Mode | 0 |
| Surface STO | STANDARD |
| Surface 3 | STANDARD |
| Surface 4 | STANDARD |
| Surface 5 | STANDARD |
| Surface 6 | STANDARD |
| Surface 7 | BICONICX |
| X Radius | 0 |
| X Conic | 0 |
| Aperture | Floating Aperture |
| Maximum Radius | 15 |
| Surface 8 | STANDARD |
| Aperture | Floating Aperture |
| Maximum Radius | 15 |
| Surface 9 | STANDARD |
| Aperture | Floating Aperture |
| Maximum Radius | 15 |
| Surface 10 | STANDARD |
| Aperture | Floating Aperture |
| Maximum Radius | 15 |
| Surface 11 | PARAXIAL |
| Focal length | 200 |
| OPD Mode | 0 |
| Surface 12 | STANDARD |
| Surface 13 | STANDARD |
| Surface 14 | PARAXIAL |
| Focal length | 200 |
| OPD Mode | 0 |
| Surface 15 | STANDARD |
| Surface 16 | STANDARD |
| Surface 17 | STANDARD |
| Surface 18 | STANDARD |
| Surface 19 | BICONICX |
| X Radius | 7.5444636 |
| X Conic | −1.0886122 |
| Aperture | Floating Aperture |
| Maximum Radius | 8 |
| Surface 20 | STANDARD |
| Aperture | Floating Aperture |
| Maximum Radius | 8 |
| Surface 21 | STANDARD |
| Aperture | Floating Aperture |
| Maximum Radius | 5 |
| Surface 22 | BICONICX |
| X Radius | 0 |
| X Conic | 0 |
| Aperture | Floating Aperture |
| Maximum Radius | 4 |
| Surface 23 | STANDARD |
| Surface IMA | STANDARD |

The surface data for surfaces OBJ (object), 1, and STO (stop) correspond to an object to be imaged (not shown), first relay lens group 102, and system stop (pupil) 104, respectively. Surface data for surfaces 3-6, 7-10, 11-14, 15-18, 19-22 correspond to intermediate image plane 106, first biconic lens group 108, second relay lens group 110, variable filter 112, and second biconic lens group 114, respectively. Surface data for surface 23 and IMA (image) correspond to the image focal plane and an image 116 of the object, respectively.

Surface 7 corresponds to a biconic surface of first biconic lens group 108 that distorts the system pupil. The biconic surface converges the horizontal rays faster than the top and bottom (ire., vertical) rays and thereby distorts the pupil from a circular shape to a non-circular shape, such as a slit shape. In one example, the biconic surface of lens 108*a* is curved in one dimension and flat in another (e.g., a section of a cylinder or a cylindrical lens). In a further example, one radius of surface 7 is about 150 mm, and the other radius is infinity (i.e., the other radius is flat). The radius of 150 mm in the one direction, because glass has an index of about 1.5, makes a lens in one dimension have a focal length of about 150 mm. Surface STO (the stop) is about 380 mm from surface 7, so in one dimension, the resulting pupil (image of the stop) is at about 1/[(1/150)−(1/380)], or about 250 mm from surface 7. Because there is more optical power in the horizontal dimension than the vertical dimension, a tall and narrow (rather than round) slit-shaped image of the stop (i.e., the pupil) is formed at surface 17. An example of a distorted pupil is shown in FIG. 2B and is described in more detail below.

FIG. 2B shows an axial view of an example of a distorted or compressed pupil 202 at surface 17 in accordance with an embodiment of the present invention. In one example, pupil 202 is distorted from an original circular shape having a diameter D of about 10 mm into a slit or strip shape having a width $W_2$ of about 1 mm at a center line. Thus, pupil 202 has a width compressed by a ratio $W_2/D$ of about 1:10. In other words, pupil 202 may be distorted or compressed to have an elliptical shape. Such a pupil would have a semi-major axis and a semi-minor axis with the semi-major axis being larger than the semi-minor axis. Accordingly, the system forms a highly astigmatic image of the pupil, such that the image is long and thin at each astigmatic focus. Advantageously, as pupil 202 moves toward being shaped more like a slit (line) than an ellipse (circle), the variable filter is able to operate on the light bundle more effectively.

Referring again to FIG. 2A, surfaces 19 and 22 correspond to biconic surfaces of second biconic lens group 114 that provide focus, color correction, and/or correction of aberrations from the image after filtering, in particular aberrations resulting from the pupil distortion. Surface 19 (of lens 114a) corresponds to the front surface of second biconic lens group 114 and surface 22 (of lens 114b) corresponds to the back surface of second biconic lens group 114. Surface 19 has power in both axes but the powers are close to each other, therefore making surface 19 weakly biconic. Thus, surface 19 sharpens the image. Surface 22 is strongly biconic, in one example having a radius of 6.9 mm in one direction and a flat surface in the other direction, and further subtracts aberrations and restores the image. Using two biconic surfaces at the end of the system thus advantageously corrects the filtered image. However, it should be noted that using one biconic surface to restore the image is also within the scope of the present invention.

In this embodiment, first biconic lens group 108 and second biconic lens group 114 are each in the form of achromatic doublets (BK7 and F2 are typical crown and flint glasses). For example, lenses 108a, 108b and 114a, 114b are crown and flint glass pairs. In one example, flint glass. 108b and 114b each helps provide color correction. It is noted, however, that one skilled in the art may pick optimal glasses based on the wavelengths of light to be relayed, and may add more lenses to the system to further sharpen the image, particularly if a larger field of view is desired.

The other lenses (at surfaces 1, 11, and 14) are noted as "paraxial" by the ZEMAX program, as the software is treating them as perfect lenses. However, those skilled in the art will be able to design these elements to follow desired specifications. Paraxial lenses focus rays to an image of system stop 104 (also the system pupil).

The specific nomenclature representing the shapes, compositions, and definitions of the elements as presented in Table 1 follow standards as set forth in the ZEMAX manual. Lenses may be comprised of various applicable materials, including but not limited to glass, such as crown-glass type BK7 and flint glass type F2, and optical plastic, such as Lexan® commercially available from the General Electric Company. Other surface data values for each individual element/group will become apparent to those of ordinary skill in the art in light of the present disclosure and may therefore be determined through routine experimentation dependent on the overall configuration and positioning of the individual elements/groups within optical system 100 and the quality of the image desired.

Figure 3:
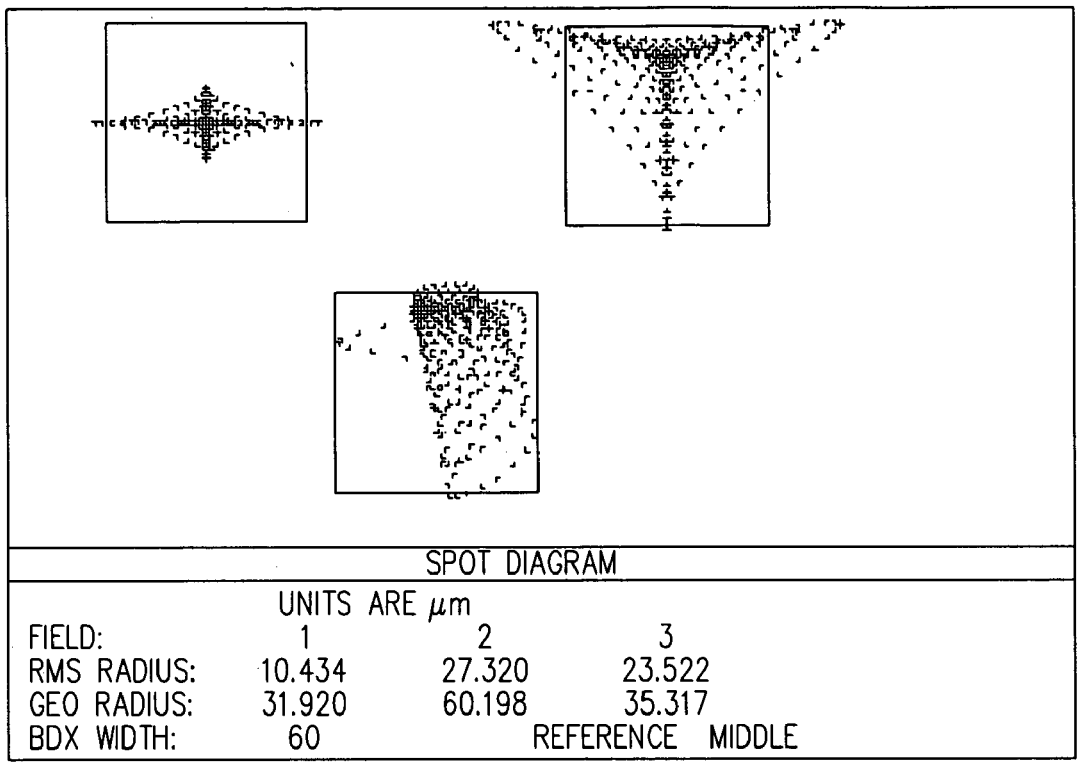
FIG. 3 is a spot diagram illustrating image focusing performance using an example of an optical system in accordance with an embodiment of the present invention.

FIG. 3 is a spot diagram illustrating image focusing performance using an example of an optical system in accordance with an embodiment of the present invention. In one example, blurring is limited to four pixels of a camera with 15 μm pixels, such as a STAR-1000 imager from Fill Factory of Belgium, and most of the energy is contained within one resolution element (line-pair), 30 μm.

Figure 4:
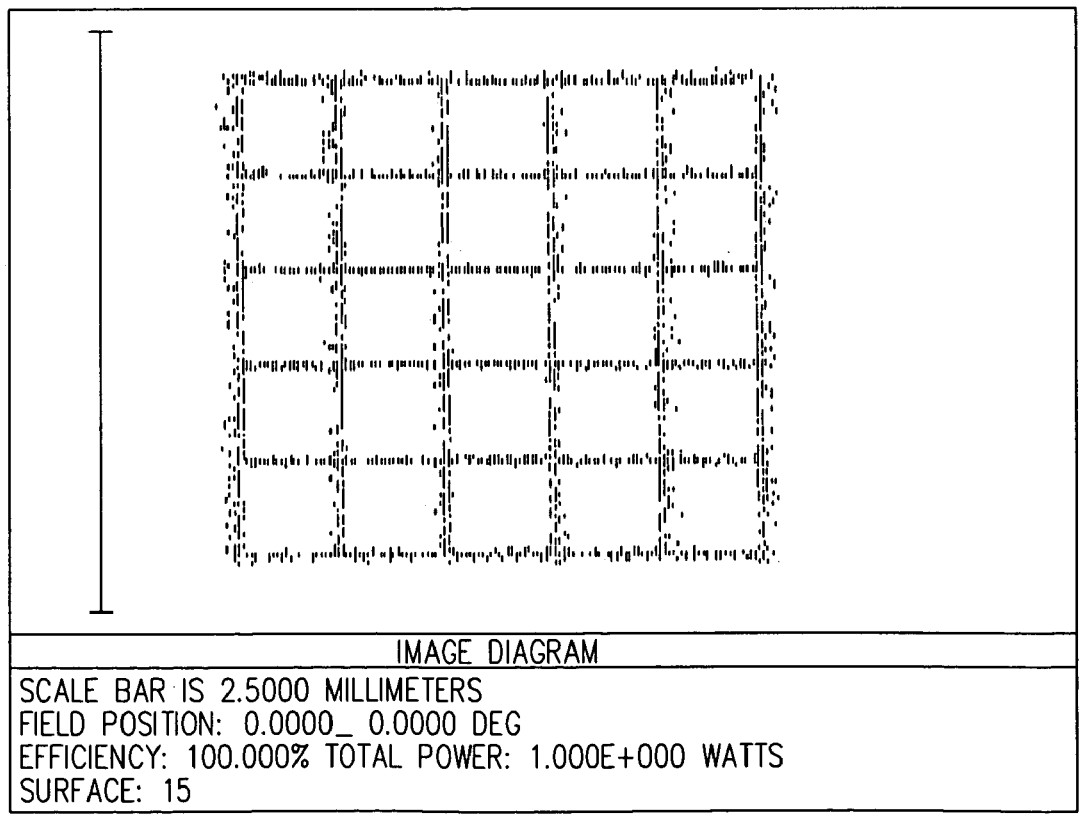
FIG. 4 is an image diagram illustrating image distortion and filtering efficiency using an example of an optical system in accordance with an embodiment of the present invention.

FIG. 4 is an image diagram illustrating image distortion and filtering efficiency using an example of an optical system in accordance with an embodiment of the present invention. A test sample grid was imaged virtually undistorted with minor blurring. Advantageously, the system and method of the present invention provides substantially 100% efficiency of filtering, low cost, high robustness, low distortion, and good-image quality.

Advantageously, the present invention provides superior color recognition with space, power, and weight improvement. In one example, the present invention may be used with small, low power, and light weight sensors for autonomous space vehicles to assess other objects in space, and with machine vision applications, such as quality control and matching of paint colors. Other areas of application include but are not limited to robotic vision, photography, and interior decorating.

Embodiments described above illustrate but do not limit the invention. It should also be understood that numerous modifications and variations are possible in accordance with the principles of the present invention. For example, more or less lenses as well as variation or adjustment in tilt or centering of lenses or other elements may occur according to desired image quality or filtering requirements. Accordingly, the scope of the invention is defined only by the following claims.

I claim:

1. An optical system, comprising:
   a first biconic surface that receives a plurality of light ray bundles originating from a two-dimensional image of an object, the first biconic surface distorting a pupil from a circular shape to a slit shape thereby compressing the plurality of light ray bundles into a compressed beam of light with a slit-shaped cross-section;
   a variable filter for filtering the compressed beam of light; and
   a secondary group of biconic surfaces that corrects aberrations from the filtered beam of light and provides a filtered two-dimensional image at an image focal plane, the secondary group of biconic surfaces including a weak biconic surface and a strong biconic surface.

2. The system of claim 1, wherein the first biconic surface has a radius of 150 mm in one direction and is flat in another direction, and wherein the second biconic surface has a radius of 6.9 mm in one direction and is flat in another direction.

3. The system of claim 1, wherein the pupil has a width compressed by a ratio of about 10:1.

4. The system of claim 1, wherein the pupil is distorted from a circular shape with a diameter of about 10 mm to a slit shape with a maximum width of about 1 mm.

5. The system of claim 1, wherein the variable filter is selected from the group consisting of a circular variable filter, a linear variable filter, an electronically variable filter, and a prism.

6. The system of claim 1, further comprising a first relay lens for providing an intermediate image of the object.

7. The system of claim 1, further comprising a system stop including a circular aperture with a diameter of about 15 mm providing a field of view of about 0.5 degree.

8. The system of claim 1, further comprising a relay lens optically coupled to the first biconic surface for relaying the compressed beam of light to the variable filter.

9. An optical system, comprising:
   a first relay lens for providing an intermediate two-dimensional image of an object through a circular system stop;

a first biconic lens group optically coupled to the first relay lens, the first biconic lens group receiving a plurality of light ray bundles originating from the intermediate two-dimensional image and distorting a pupil from a circular shape to a slit shape thereby compressing the plurality of light ray bundles into a compressed beam of light with a slit-shaped cross-section;

a second relay lens optically coupled to the first biconic lens group for relaying the compressed beam of light;

a variable filter optically coupled to the second relay lens for filtering the compressed beam of light;

and a second biconic lens group optically coupled to the variable filter for correcting aberrations from the filtered beam of light to restore a filtered two-dimensional image at an image focal plane, the second biconic lens group including a weak biconic surface and a strong biconic surface.

10. The system of claim 9, wherein the pupil has a width compressed by a ratio of about 10:1.

11. The system of claim 9, wherein the variable filter is selected from the group consisting of a circular variable filter, a linear variable filter, an electronically variable filter, and a prism.

12. A method of spectral filtering, comprising:
receiving a plurality of light ray bundles originating from a two-dimensional image of an object at a first biconic surface;

distorting a pupil from a circular shape to a slit shape with the first biconic surface thereby compressing the plurality of light ray bundles into a compressed beam of light with a slit-shaped cross-section;

filtering the compressed beam of light; and correcting aberrations from the filtered beam of light with a secondary group of biconic surfaces to provide a filtered two-dimensional image at an image focal plane, the secondary group of biconic surfaces including a weak biconic surface and a strong biconic surface.

13. The method of claim 12, wherein the image of the object is provided to the first biconic surface with a first relay lens.

14. The method of claim 12, wherein the pupil is distorted to have a width compressed by a ratio of 10:1.

15. The method of claim 12, wherein the compressed beam of light is relayed from the first biconic surface to a variable filter with a relay lens.

16. The method of claim 15, wherein the variable filter is selected from the group consisting of a circular variable filter, a linear variable filter, an electronically variable filter, and a prism.

17. A pupil relay system, comprising:
a first lens group for receiving a plurality of light ray bundles originating from a two-dimensional image of an object, the plurality of light ray bundles produced by an optical system having an aperture stop, the first lens group including a first biconic surface capable of inducing an astigmatic pupil of the stop;

and a second lens group that reduces the astigmatism induced by the first biconic surface and provides a filtered two-dimensional image at an image focal plane, the second lens group including a weak biconic surface and a strong biconic surface.

18. The system of claim 17, wherein the first and second lens groups each form achromatic doublets having positive optical power.

19. The system of claim 17, further comprising a variable filter at the astigmatic pupil of the stop, the variable filter selected from the group consisting of a circular variable filter, a linear variable filter, an electronically variable filter, and a prism.

* * * * *

UNITED STATES PATENT AND TRADEMARK OFFICE
CERTIFICATE OF CORRECTION

PATENT NO. : 7,609,441 B2  Page 1 of 1
APPLICATION NO. : 11/138782
DATED : October 27, 2009
INVENTOR(S) : Mark A. Lundgren It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Twelfth Day of October, 2010

David J. Kappos
*Director of the United States Patent and Trademark Office*